United States Patent
Fullmer et al.

(10) Patent No.: US 6,635,293 B2
(45) Date of Patent: Oct. 21, 2003

(54) FINELY DISPERSED CAROTENOID SUSPENSIONS FOR USE IN FOODS AND A PROCESS FOR THEIR PREPARATION

(75) Inventors: Linda A. Fullmer, Ankeny, IA (US); Anthony W. Newman, Forth Worth, TX (US); Robert S. Stomp, Des Moines, IA (US); Jerry L. Newman, West Des Moines, IA (US)

(73) Assignee: Kemin Foods, L.C., Des Moines, IA (US)

( * ) Notice: Subject to any disclaimer, the term of this patent is extended or adjusted under 35 U.S.C. 154(b) by 0 days.

(21) Appl. No.: 09/999,863

(22) Filed: Oct. 23, 2001

(65) Prior Publication Data

US 2003/0129290 A1 Jul. 10, 2003

(51) Int. Cl.$^7$ ............................. A23L 1/275; A23L 2/58
(52) U.S. Cl. ................ 426/250; 426/330.3; 426/590; 426/540; 426/541; 424/442; 424/451; 514/544
(58) Field of Search ............................ 426/250, 330.3, 426/590, 540, 541; 424/442, 451; 514/544

(56) References Cited

U.S. PATENT DOCUMENTS

| | | | | |
|---|---|---|---|---|
| 3,886,294 A | * | 5/1975 | Emodi et al. | 426/540 |
| 3,998,753 A | | 12/1976 | Antoshkiw et al. | |
| 5,437,880 A | * | 8/1995 | Takaichi et al. | 426/73 |
| 5,532,009 A | | 7/1996 | Fortier | |
| 5,607,707 A | * | 3/1997 | Ford et al. | 426/2 |
| 5,891,907 A | * | 4/1999 | Kolter et al. | 514/458 |
| 5,895,659 A | * | 4/1999 | Luddecke et al. | 424/442 |
| 6,007,856 A | * | 12/1999 | Cox et al. | 426/250 |
| 6,132,790 A | * | 10/2000 | Schlipalius | 426/540 |
| 6,287,615 B1 | * | 9/2001 | Runge et al. | 426/268 |
| 6,500,473 B1 | * | 12/2002 | Koehler et al. | 426/89 |

FOREIGN PATENT DOCUMENTS

| | | | |
|---|---|---|---|
| WO | WO 94/21231 | * | 9/1994 |

OTHER PUBLICATIONS

Seddon, et al., *J. Amer. Medical Association*, 1994, 272 (18): 1413–1420.

Subagio, Achmad; Morita, Naofumi; and Wakaki, Hiroko, "Stability of lutein and its myristate esters", *Bioscience Biotechnology and Biochemistry*, Oct. 1999, vol. 63 (10): p. 1784–1786.

Shi, X–M. and Chen, F., "Stability of lutein under various storage conditions", *Nahrung*, 1997, vol. 41 (1): p. 38–41.

Siems, W.G.; Sommerburg, O.; and Kuijik, F.G.M. Van, "Lycopene and beta–carotene decompose more rapidly than lutein and zeaxanthin upon exposure to various pro–oxidants in vitro", *BioFactors*, 1999, vol. 10 (2/3): p. 105–113.

Rodriguez–Amava, D.B., "Stability of carotenoids during the storage of food", *Developments in Food Science*, 1993, vol. 33, p. 591–628.

Mortensen, A. and Skibsted, L.H., "Kinetics and mechanism of the primary steps of degradation of carotenoids by acid in a homogenous solution", *J. Agric. Food Chem.*, Feb. 2000, vol. 48 (2): p. 279–286.

\* cited by examiner

*Primary Examiner*—Nina Bhat
(74) *Attorney, Agent, or Firm*—Kent Herink; Daniel Rosenberg; Davis Law Firm

(57) ABSTRACT

A stable product containing finely a dispersed carotenoid for use in supplementing aqueous systems, such as foods, beverages, and personal care products, with the carotenoid. An emulsifier is dissolved in water and an anti-foam agent and a source of the carotenoid are added to the solution. The concentrated product may be added to the aqueous systems or dried to form a powder that is readily dispersible in aqueous systems. The product may also include an antioxidant to preserve the activity of the carotenoid. Emulsifiers particularly suited for use include sucrose fatty acid esters. The product is produced without the use of organic solvents or elevated temperatures.

15 Claims, No Drawings

FINELY DISPERSED CAROTENOID SUSPENSIONS FOR USE IN FOODS AND A PROCESS FOR THEIR PREPARATION

BACKGROUND OF THE INVENTION

1. Field of the Invention

The invention relates generally to food, beverage, and personal care product additives and, more specifically, to finely dispersed carotenoid suspensions for use in supplementing foods, beverages, and personal care products with carotenoids, for use in coloring foods and beverages, and to a process for their preparation.

2. Background of the Prior Art

Carotenoids are naturally-occurring yellow to red pigments of the terpenoid group that can be found in plants, algae, and bacteria. Carotenoids include hydrocarbons (carotenes) and their oxygenated, alcoholic derivatives (xanthophylls). They include actinioerythrol, astaxanthin, bixin, canthaxanthin, capsanthin, capsorubin, β-8'-apo-carotenal (apo-carotenal), β-12'-apo-carotenal, α-carotene, β-carotene, "carotene" (a mixture of α- and β-carotenes), γ-carotene, β-cryptoxanthin, lutein, lycopene, violerythrin, zeaxanthin, and esters of hydroxyl- or carboxyl-containing members thereof. Many of the carotenoids occur in nature as cis- and trans-isomeric forms, while synthetic compounds are frequently racemic mixtures. The carotenes are commonly extracted from plant materials. For example, lutein extracted from marigold petals is widely used as an ingredient in poultry feed where it adds color to the skin and fat of the poultry and to the eggs produced by the poultry. Many of the carotenes are also made synthetically; much of the commercially available β-carotene has been made through synthesis.

Carotenoids are used in the pharmaceutical industry and as ingredients in nutritional supplements, most commonly to date because of their pro-vitamin A activity. They have been extensively studied as antioxidants for protection against cancer and other human and animal diseases. Among the dietary carotenoids, the focus has been on β-carotene. More recently, research has begun to elicit the broad role that other carotenoids play in human and animal health. The xanthophylls in particular have been shown to possess strong antioxidant capabilities and may be useful in reducing the risk of disease. For example, the consumption of lutein and zeaxanthin has been identified as leading to a 57 percent reduction in age-related macular degeneration (Seddon et al., 1994. J. Amer. Med. Assoc. 272(18): 1413–1420). Lycopene has been identified as a nutrient that is active in reducing the risk of prostate cancer.

Carotenoids have also been of wide interest as a source of added color for food and drink products and many efforts have been made to attempt to use them as "natural" colorants for foods and beverages. However, their insolubility in water, their low solubility in fats and oils, high melting points, and their sensitivity to oxidation has limited their use, particularly in water-based products such as beverages and juices and products to which water is to be added.

Current processes for incorporating carotenoids into water-based beverages or foods involve the use of organic solvents, oils with emulsifiers, high heating, or high-shear mixing. Many of the current processes, particularly in beverages, produce a deposit of the carotenoids around the perimeter of the container in the region of the surface of the treated food or beverage, known as "ringing." Optical clarity is a critical characteristic for many beverage compositions. Various fruit drinks, fruit juices and fortified water drinks have included terms such as "crystal clear" and "fresh" to distinguish their image and marketability. Traditionally, this clarity has been difficult to achieve when carotenoids are added to these aqueous compositions. The use of emulsifiers and oil for the incorporation of carotenoids will commonly result in cloudiness of the final aqueous composition.

In U.S. Pat. No. 3,998,753, a dispersible carotenoids product is made by forming a solution of carotenoids and a volatile organic solvent and emulsifying the solution with an aqueous solution containing sodium lauryl sulfate using high speed mixing with high shear. The volatile solvent is removed by heating the emulsion while maintaining the high speed mixing with high shear.

In U.S. Pat. No. 5,532,009, a powdered water soluble β-carotene composition is prepared by initially forming an aqueous solution of cyclodextrin. The solution is heated to between 45 and 95° C. Separately, β-carotene is dissolved in an organic solvent to form a supersaturated solution of β-carotene. The β-carotene solution is added to the hot cyclodextrin solution with rapid stirring. Upon drying, the powders are added to non-digestible fats, including polyol fatty acid polyesters and poly glycerol esters.

In U.S. Pat. No. 5,607,707, an antioxidant is dispersed in an emulsifier while heating to 40° C. The carotenoid is then added and the temperature is raised to between 80 and 200° C. while stirring. The mixture is then added to water (at least 95° C.) while stirring.

In U.S. Pat. No. 5,895,659, carotenoid suspensions are prepared by dissolving the carotenoid in a volatile, water-miscible organic solvent at preferably between 150 and 200° C. within less than 10 seconds and immediately thereafter mixing the solution with an aqueous medium at from 0 to 90° C. An emulsifier is present either in the organic solvent or the aqueous medium or both.

SUMMARY OF THE INVENTION

The present invention involves the dispersion of carotenoids into water-based systems, such as food, beverages and personal care products. A carotenoid-containing product for addition to these water-based systems is prepared by adding an emulsifier to water. A small quantity of a food-grade alcohol may be added to reduce viscosity. An antioxidant may be added to help in preventing oxidation of the carotenoid. An anti-foaming agent may be added to decrease foaming of the water and emulsifier during processing of the product and during processing of a food or beverage incorporating the product. The carotenoid is then added while mixing. No elevated temperatures, high-shear mixing, or organic solvents are required to form the product.

In a preferred embodiment of the invention, the emulsifiers are selected from cationic, anionic, and non-ionic emulsifiers having a hydrophilic/lipophilic balance (HLB) of between about 12 and about 20, and preferably between about 15 and 18. Examples of suitable emulsifiers include sucrose fatty acid esters (SFAE) and poly glycol esters (PGE). The SFAE and PGE emulsifiers are preferred also because they have very little taste. Emulsifiers may be used singly or in combination; in particular, emulsifiers having diverse HLB numbers may be advantageously used in combination with each other. The amount of emulsifier in the composition is selected as an amount which will vary depending upon which form of carotenoid is used, its method of preparation, and how much is included. For example a dispersion of lutein in oil will require a higher concentration of emulsifier or blend of emulsifiers to disperse the oil and the carotenoid than the corresponding quantity of crystalline lutein.

The water and emulsifier mixture, under certain circumstances, may become too viscous for efficient processing. In these circumstances, a food grade alcohol, such as ethanol, may be added to reduce the viscosity. It is preferred that no more than about 4 weight percent alcohol be used. In commercial processing of the product of the present invention, it is greatly preferred not to include the alcohol in the mixture since it adds a flammable substance to an otherwise non-flammable mixture and thus creates safety issues which add substantially to the costs associated with carrying out the process.

Any suitable commercially available anti-foam agent may be added to the mixture. Examples of suitable anti-foam agents include Silicone AF-100 FG (Thompson-Hayward Chemical Co.), 'Trans' Silicone Antifoam Emulsion (Trans-Chemco, Inc.), and 1920 Powdered Antifoam (Dow Corning Chemical). The amount of the anti-foam agent added is kept to the minimum required to prevent excessive foaming during processing of the product and, if desired by the consumer of the product, to prevent excessive foaming during processing of the food or beverage into which the product is being incorporated. Amounts of the anti-foam agent between 1 ppm and up to about 10 ppm in the final product are to be used.

It may be desired to incorporate an antioxidant into the mixture to assist in the prevention of oxidation of the carotenoid so as to preserve its color and activity. Antioxidants known for use in stabilizing carotenoids include tocopherols, extracts of rosemary, ascorbyl palmitate, citric acid, ascorbic acid, BHA, and BHT.

Carotenoids suitable for use in the product include actinioerythrol, astaxanthin, bixin, canthaxanthin, capsanthin, β-8'-apo-carotenal (apo-carotenal), β-12'-apo-carotenal, α-carotene, β-carotene, "carotene" (a mixture of α- and β-carotenes), γ-carotene, β-cryptoxanthin, lutein (a xanthophyll), lycopene, violerythrin, zeaxanthin, and esters of hydroxyl- or carboxyl-containing members thereof. Preferably, the carotenoids are in crystalline form. Examples of crystalline carotenoids which can be used in the practice of this invention include lutein, β-carotene, β-cryptoxanthin, α-carotene, lycopene, astaxanthin, canthaxanthin, and zeaxanthin. The carotenoids may be incorporated individually or in combination. The carotenoids are added in an amount to create a concentrated product having between about 1 weight percent and about 20 weight percent carotenoid(s). When the concentrated product is added to a food or beverage product, the levels of carotenoid present in the final product are between about 0.1 mg and 5 mg per serving, depending on the color desired or the level of supplementation of the carotenoid(s), or both. In a beverage, a preferred range is between about 0.2 mg and 1.5 mg per 8 oz.

The concentrated product of the present invention is a dispersion of the carotenoid in the water and emulsifier mixture. The concentrated product, upon visual examination, has the appearance of being a dispersion of discrete crystals of the carotenoid. Microscopic examination clearly shows individual crystals. Upon addition of the concentrated product to a food or beverage, the carotenoid is more finely dispersed and individual crystals are no longer visible. The concentrated product, if desired, may be incorporated into beverages to yield a beverage that is optically clear. The term "optically clear" is used to describe a product exhibiting a percentage transmittance value of between about 95% and about 100%, determined at a wavelength of 800 nm in a 1 cm path length cuvette. The optical clarity of the finished products obtainable with the present invention indicate that the carotenoids are finely dispersed as micelles or as microemulsions. This fine dispersion of carotenoids in aqueous preparations may help to promote the efficient uptake of such materials by body tissues when the composition is presented to the body. Moreover, the presence of the emulsifier is also believed to assist in the efficient transfer of these substances across cellular membranes. While the present invention is particularly suited to the production of optically clear products, the present invention can also be used to prepare opaque, cloudy products, specifically juices, soups, sauces, and syrups. The invention is also suitable for use as an additive to fortified foods, such as ready-to-eat cereals, sports and nutrition bars, bread, and the like.

The dispersions of the carotenoids created by the present invention, whether in the concentrated product or in the finished composition, are substantially stable. No ringing of the carotenoids is observed after storage in excess of 7 days at reduced, ambient, and elevated temperatures. Repeated chilling and heating of the product did not reveal any changes in its physical characteristics. The stability of the carotenoid products also makes them attractive as colorants and additions to personal care products which have an aqueous phase, such as lotions, emollients, sun screens, and the like.

The products of the present invention are more economical than other compositions which attempt to obtain similar results, specifically in that no organic solvents are required, no heating is required, no high speed or high-shear mixing is required, and a relatively small amount of emulsifiers are required. The products are therefore also simpler to formulate and manufacture than those already known for the incorporation of carotenoids into drinks and can be used to give a wider range of products, particularly reduced fat and no-fat products.

It is an object of the present invention to provide a finely dispersed carotenoid suspension which can be added to foods and beverages, and a process for their preparation.

It is another object of the present invention to provide a process for preparing a finely dispersed carotenoid suspension which avoids the use of organic solvents, elevated temperatures, high speed mixing, or high-shear mixing.

It is a further object of the present invention to provide a finely dispersed carotenoid suspension which are physiologically acceptable, and a process for their preparation.

These and other objects of the invention will be made apparent to those skilled in the art upon a review and understanding of this specification, the associated drawings, and the appended claims.

DETAILED DESCRIPTION OF A PREFERRED EMBODIMENT

The process according to the invention is preferably used to prepare finely dispersed carotenoid suspensions for use to supplement foods and beverages with carotenoids, for use in coloring personal care products, foods and beverages, and to a process for their preparation.

Examples of carotenoids which can be used according to the invention are the known, available, natural or synthetic representatives of this class of compounds, for example actinioerythrol, astaxanthin, bixin, canthaxanthin, capsanthin, capsorubin, β-8'-apo-carotenal (apo-carotenal), β-12'-apo-carotenal, α-carotene, β-carotene, "carotene" (a mixture of α- and β-carotenes), γ-carotene, β-cryptoxanthin, lutein, lycopene, violerythrin, zeaxanthin, and esters of hydroxyl- or carboxyl-containing members thereof. The preferred carotenoids are lutein, β-carotene, β-cryptoxanthin, lycopene, zeaxanthin, canthaxanthin), and astaxanthin.

Emulsifiers that can used in the present invention include all cationic, anionic, and non-ionic emulsifiers that are also acceptable for ingestion or application in or to humans and animals on administration in the usual amounts and do not result in harm. Emulsifiers which can be used according to the invention include lecithin and lysolecithin, sucrose fatty acid esters, and poly glycol esters. In a preferred embodiment of the invention, sucrose fatty acid esters (SFAE) are used. Sucrose fatty acid esters are the mono-, di-, and tri-esters of sucrose with fatty acids and are derived from sucrose and edible tallow, hydrogenated edible tallow, or edible vegetable oils. The total content of mono-, di-, and tri-esters is greater than 70%. Sucrose esters are food grade, odorless, nontoxic, and impart minimal flavor. They are also a non-irritant to the eyes and skin and so are suitable for pharmaceutical and cosmetic applications. Examples of SFAE particularly suited for use are sucrose stearate, sucrose palmitate, sucrose myristate, and sucrose laurate, for example, those sold under the product names S-1570, P-1570, LWA-1570, M-1695 and L-1695 by Mitsubishi-Kagaku Foods Corporation. Also preferred are poly glycol esters (PGE). Examples particularly suited for use are SWA-10D, L-7D, and L-10D available from Mitsubishi-Kagaku Foods Corporation.

The amounts of emulsifier(s) used are selected within a range which results in a finely dispersed, stable carotenoid suspension. In the liquid form of the concentrated product, the emulsifier comprises between about 1 to 40% by weight, and preferably between about 20% and about 30%; the carotenoid comprises between about 0.1 and about 20% by weight, and preferably between 5 and 10%; with water comprising the balance. Higher amounts of the emulsifier may be required if the carotenoid is supplied in a form containing an oil, whereas lower amounts generally will be sufficient if the carotenoid is supplied in the form of crystals.

An antioxidant can be added to the water and emulsifier mixture, to the concentrated product, and to the carotenoid prior to its addition to the water and emulsifier mixture. The antioxidant is used to increase the stability of the active ingredient to oxidative breakdown. The antioxidant if used is preferably dissolved together with the carotenoids in the water and emulsifier mixture. Examples of antioxidants which can be used include tocopherols, extracts of rosemary, ascorbyl palmitate, citric acid, ascorbic acid, BHA, and BHT. Other suitable antioxidants can also be used. The amount of antioxidant to be used depends on the particular antioxidant selected and the environment in which the carotenoid composition is to be used. The range of antioxidant is from about 0.01 to about 0.1 percent by weight, based on the weight of the carotenoid used in the composition.

The concentrated carotenoid products of this invention include from about 0.1 to about 20 percent by weight carotenoid, based on the weight of the concentrated product in liquid form, and between about 1 to about 35 percent by weight carotenoid, based on the weight) of the concentrated product in dry form.

Use of an anti-foaming agent prevents undesirable foaming of the composition during processing of the concentrated product and during the manufacturing of food or beverage items to which the concentrated product has been added. The amount of anti-foam agent to be used depends on the particular agent selected and the composition and processing conditions of the food or beverage processor which will be using the concentrated product. The range of anti-foam agent is from about 1 to about 10 ppm, based on the weight of the finished food or beverage product.

Optical clarity is a critical characteristic for many beverage compositions. Various fruit drinks, fruit juices and fortified water drinks have included terms such as "crystal clear" and "fresh" to distinguish their image and marketability. Traditionally, this clarity has been difficult to achieve when carotenoids are added to these aqueous compositions. The use of emulsifiers and oil for the incorporation of carotenoids will commonly result in cloudiness of the final aqueous composition. The present invention utilizes, emulsifiers, preferably sucrose fatty acid esters (SFAE), and antifoam to disperse carotenoids in beverages and other water-based systems, while maintaining their optical clarity. For the purposes of this disclosure, optical clarity will be defined by the percent transmittance value determined at the wavelength of 800 nm in a 1 cm path length cuvette.

The processes to incorporate carotenoids into beverages that are in use today, utilize high shear mixing, organic solvents, high heating or oil and emulsifiers. Often times, the result of the carotenoid incorporation involves ringing of the carotenoid in the finished product. This characteristic is visually undesirable and requires considerable shaking of the beverage to redistribute the carotenoid. Many times the ring is adhered to the glass and becomes difficult, if not impossible, to redistribute. The present invention utilizes emulsifiers, preferably sucrose fatty acid esters (SFAE), and antifoam to disperse carotenoids in beverages and other water-based systems, while maintaining their stability against ringing.

There are several factors that may affect the stability against ringing in aqueous compositions. These include the level of SFAE that is required to keep the carotenoid in the suspension; the hydrophilic/lipophilic balance (HLB) of the SFAE, which may affect the interaction of the carotenoids with the aqueous composition; and the inclusion level of the SFAE/carotenoid suspension, which may determine the stability against ringing. The inherent compositional difference of fruit drinks and fortified water may suggest that they will have differences in stability against ringing. These factors have been examined to determine whether there are preferred levels of SFAE and carotenoids that contribute to the stability against ringing.

Manufacturing Process

The carotenoid suspensions are prepared according to the invention by dissolving the emulsifier in a quantity of water at ambient temperature, and mixing the solution until the emulsifier has been dissolved in the water. If used, the alcohol and/or the antioxidant are/is added to the water and emulsifier solution. The anti-foam agent is also added. The particular order of addition of the alcohol, antioxidant, and anti-foam agent is not critical. The carotenoid is then mixed into the emulsifier solution until evenly dispersed. The resulting concentrated product is used by food and beverage processors to add either color or supplementation of carotenoids, or both, to their products by adding the concentrated product at an appropriate step in their manufacturing process. The concentrated product is a viscous liquid that may be dispensed by liquid metering devices commonly used by food and beverage processors. Alternatively, the concentrated product may be dried to form a dispersible powder. Preferred methods of drying include lyophilization, spray drying, and, most preferably, horizontal thin-film evaporation. In the experiments described herein, the compositions were dried until the total moisture content was less than 1%.

EXAMPLE 1

Optical clarity was examined using SFAE/carotenoid liquid compositions in potable water and a model beverage system. The SFAE/carotenoid dry composition are used in a model beverage system. Liquid SFAE/carotenoid compositions were made by slowly mixing the appropriate weight percent of SFAE into the water until dissolved (Tables 2–5). At this point, the carotenoid was mixed into the SFAE/water mixture until evenly dispersed. The dry SFAE/lutein composition was prepared by removing the water from the liquid SFAE/lutein composition using a horizontal wiped film evaporator until the total moisture was less than 1%.

These SFAE/carotenoid compositions were added either to potable water or to the model beverage system. The optical clarity was measured using a Hewlett Packard UV-Visible Spectrophotometer Model 8453. The instrument was blanked with water for the water trial and control beverage for the beverage trials. A quartz cuvette having a 1 cm path length is rinsed three times with the sample and then the transmittance at 800 nm is read from the spectrophotometer.

Table 1 provides the materials that were used in preparing the compositions.

examples, it refers to lutein derived from FloraGLO® Brand Crystalline Lutein and so also includes the zeaxanthin present in FloraGLO® Brand Crystalline Lutein.

The greatest optical clarity was achieved with three different combination SFAE/Lutein compositions. The data presented Table 1 demonstrates that the use of the L-1695 SFAE at a ratio of 20% with 5% lutein, and the use of the M-1695 and L-1695 at a ratio of 20% with 10% lutein produces the highest degree of optical clarity. These data suggest that there is an optimum ratio of SFAE to lutein in water. If the level of SFAE is too high, the SFAE cause a greater reduction in clarity than the higher levels of lutein inclusion. Although differences in optical clarity are slight, this data also suggests that SFAE L-1695 produces greater

TABLE 1

Materials

| Product | Manufacturer | Chemical Name | Ingredients (%) | |
|---|---|---|---|---|
| L-1695 | Mitsubishi | 80% Sucrose monolaurate | | |
| M-1695 | Mitsubishi | 80% Sucrose monomyristate | | |
| FloraGLO® Brand Crystalline Lutein | Kemin Foods, L.C. | Lutein Zeaxanthin | | |
| Model Beverage System | Kemin Foods, L.C. | | Water | 72.71 |
| | | | HFCS | 17.00 |
| | | | Juice | 10.00 |
| | | | Citric Acid | 0.250 |
| | | | Ascorbic Acid | 0.040 |
| Water | | | | |
| Lycopene | Sigma | Lycopene | | |
| β-Carotene | Sigma | β-Carotene | | |
| Lutein Esters | Bioquimex Reka | Lutein Esters | | |
| Zeaxanthin | Hoffman LaRoche | Zeaxanthin | | |

FloraGLO® Brand Crystalline Lutein has a specified analysis of greater than or equal to 75% lutein and between 2% and 8% zeaxanthin. Where the term "lutein" is used in the optical clarity at higher levels of lutein than SFAE M-1695. Table 2 also demonstrates that the greatest optical clarity is achieved at a lutein level of 0.5 mg/8 fl oz serving of water.

TABLE 2

Optical Clarity of Water Using Liquid SFAE/Lutein Composition

| | Optical Clarity | | Conc. Product Composition | |
|---|---|---|---|---|
| Sample | (% Transmittance @ 800 nm) | mg lutein/8 oz. serving | Ester | % Ester | % Lutein |
| W1 | 95.611 | 0.5 | L-1695 | 15 | 1 |
| W2 | 83.435 | 1.5 | L-1695 | 15 | 1 |
| W3 | 79.283 | 3.0 | L-1695 | 15 | 1 |
| W4 | 91.996 | 0.5 | M-1695 | 15 | 1 |
| W5 | 85.879 | 1.5 | M-1695 | 15 | 1 |
| W6 | 69.172 | 3.0 | M-1695 | 15 | 1 |
| W7 | 94.655 | 0.5 | L-1695 | 20 | 1 |
| W8 | 86.424 | 1.5 | L-1695 | 20 | 1 |
| W9 | 75.097 | 3.0 | L-1695 | 20 | 1 |
| W10 | 85.288 | 0.5 | M-1695 | 20 | 1 |
| W11 | 83.017 | 1.5 | M-1695 | 20 | 1 |
| W12 | 72.449 | 3.0 | M-1695 | 20 | 1 |
| W13 | 101.74 | 0.5 | L-1695 | 25 | 1 |
| W14 | 94.63 | 1.5 | L-1695 | 25 | 1 |
| W15 | 78.568 | 3.0 | L-1695 | 25 | 1 |
| W16 | 87.48 | 0.5 | M-1695 | 25 | 1 |
| W17 | 86.38 | 1.5 | M-1695 | 25 | 1 |
| W18 | 66.968 | 3.0 | M-1695 | 25 | 1 |
| W19 | 98.841 | 0.5 | L-1695 | 30 | 1 |
| W20 | 96.227 | 1.5 | L-1695 | 30 | 1 |
| W21 | 78.124 | 3.0 | L-1695 | 30 | 1 |

TABLE 2-continued

Optical Clarity of Water Using Liquid SFAE/Lutein Composition

| Sample | Optical Clarity (% Transmittance @ 800 nm) | mg lutein/8 oz. serving | Conc. Product Composition | | |
|---|---|---|---|---|---|
| | | | Ester | % Ester | % Lutein |
| W22 | 92.981 | 0.5 | M-1695 | 30 | 1 |
| W23 | 86.432 | 1.5 | M-1695 | 30 | 1 |
| W24 | 66.644 | 3.0 | M-1695 | 30 | 1 |
| W25 | 104.73 | 0.5 | L-1695 | 20 | 5 |
| W26 | 101.01 | 1.5 | L-1695 | 20 | 5 |
| W27 | 93.735 | 3.0 | L-1695 | 20 | 5 |
| W28 | 104.17 | 0.5 | M-1695 | 20 | 5 |
| W29 | 94.4 | 1.5 | M-1695 | 20 | 5 |
| W30 | 80.347 | 3.0 | M-1695 | 20 | 5 |
| W31 | 104.78 | 0.5 | L-1695 | 20 | 10 |
| W32 | 102.36 | 1.5 | L-1695 | 20 | 10 |
| W33 | 96.567 | 3.0 | L-1695 | 20 | 10 |
| W34 | 104.55 | 0.5 | M-1695 | 20 | 10 |
| W35 | 100.76 | 1.5 | M-1695 | 20 | 10 |
| W36 | 94.541 | 3.0 | M-1695 | 20 | 10 |

Based on the data obtained and listed in Table 2, the SFAE/lutein composition of 20% L-1695 with 5% all trans lutein was chosen for drying and the model beverage system trial. The viscosity of the M-1695 suspension was high and would present a considerable challenge for drying. It was also theorized that the sucrose fatty acid ester may provide some protection for the lutein and a higher ratio of SFAE to lutein may be advantageous. It can be seen from the data in Table 3, the optimum optical clarity (% transmittance at 800 nm) occurs in the beverage containing 0.5 mg all trans lutein/8 fl. oz. beverage. A comparison of the data in Table 3 and Table 5 indicates that optical clarity is slightly enhanced with the use of the liquid composition.

TABLE 3

Optical Clarity of Model Beverage System Using Dry SFAE/Lutein Composition

| Sample | Optical Clarity | mg lutein/8 oz. serving | Conc. Product Composition | | |
|---|---|---|---|---|---|
| | | | Ester | % Ester | % Lutein |
| 1 | 95.098 | 0.5 | L-1695 | 84 | 16 |
| 2 | 74.292 | 3.0 | L-1695 | 84 | 16 |
| 3 | 58.833 | 5.0 | L-1695 | 84 | 16 |
| 4 | 41.258 | 7.0 | L-1695 | 84 | 16 |
| 5 | 38.065 | 8.0 | L-1695 | 84 | 16 |
| 6 | 24.362 | 10.0 | L-1695 | 84 | 16 |

The ability to incorporate other carotenoids into the SFAE composition and the effects on optical clarity were also examined. Table 4 includes four additional carotenoids and the SFAE (L-1695)/carotenoid compositions. Again, the increase in level of carotenoid creates a decrease in optical clarity (% transmittance at 800 nm). The optimum optical clarity for each carotenoid was achieved using the 0.5 mg level, although it is believed possible to improve the optical clarity using different ratios of SFAE to carotenoid and/or other sucrose fatty acid ester derivatives.

TABLE 4

Optical Clarity of Water Using Liquid SFAE/Carotenoid Composition

| Sample | Optical Clarity | mg carotenoid/ 8 oz. serving | Conc. Product Composition % Ester | % Carotenoid |
|---|---|---|---|---|
| lutein | 104.73 | 0.5 | 20 | 5 |
| lutein | 101.01 | 1.5 | 20 | 5 |
| lutein | 93.735 | 3.0 | 20 | 5 |
| zeaxanthin | 98.213 | 0.5 | 20 | 5 |
| zeaxanthin | 95.692 | 1.5 | 20 | 5 |
| zeaxanthin | 94.110 | 3.0 | 20 | 5 |
| lutein esters | 97.592 | 0.5 | 20 | 5 |
| lutein esters | 94.245 | 1.5 | 20 | 5 |
| lutein esters | 91.137 | 3.0 | 20 | 5 |
| β-carotene | 96.759 | 0.5 | 20 | 5 |
| β-carotene | 94.275 | 1.5 | 20 | 5 |
| β-carotene | 87.407 | 3.0 | 20 | 5 |
| lycopene | 97.989 | 0.5 | 20 | 1 |
| lycopene | 88.387 | 1.5 | 20 | 1 |
| lycopene | 72.401 | 3.0 | 20 | 1 |

The final examination for optical clarity was performed using the various SFAE (L-1695)/carotenoid compositions in the model beverage system. The data in Table 5 indicates that optical clarity (% transmittance at 800 nm) is consistently higher for each carotenoid at the 0.5 mg/8 oz. serving inclusion level. This correlates with previous observations in Tables 2 through 4.

TABLE 5

Optical Clarity of Model Beverage System Using Liquid SFAE/Composition

| Sample | Optical Clarity | mg carotenoid/ 8 oz. serving | Conc. Product Composition % Ester | % Carotenoid |
|---|---|---|---|---|
| lutein | 97.609 | 0.5 | 20 | 5 |
| lutein | 83.017 | 3.0 | 20 | 5 |
| zeaxanthin | 99.102 | 0.5 | 20 | 5 |
| zeaxanthin | 87.707 | 3.0 | 20 | 5 |
| lutein ester | 99.607 | 0.5 | 20 | 5 |
| lutein ester | 95.000 | 3.0 | 20 | 5 |
| β-carotene | 99.314 | 0.5 | 20 | 5 |
| β-carotene | 89.643 | 3.0 | 20 | 5 |
| lycopene | 94.934 | 0.5 | 20 | 1 |
| lycopene | 50.180 | 3.0 | 20 | 1 |

The objective of this study was to determine the optical clarity of aqueous compositions that include a SFAE/carotenoid suspension. The highest level of optical clarity is consistently achieved at the carotenoid incorporation level of 0.5 mg/8 oz. serving. At this level, optical clarity ranges from 95% to 100%. As the level of carotenoid increases, optical clarity decreases. Preliminary results suggest that optical clarity may be slightly higher when the liquid SFAE/carotenoid composition is added to the water or beverage, in comparison with the dry SFAE/carotenoid composition. However, based on the findings that optical clarity of 95–100% can be achieved using several different ratios of SFAE/carotenoid, the dry composition may be further enhanced with optimization of ratios.

EXAMPLE 2

The objective of this experiment was to determine the stability of a sucrose fatty acid ester/carotenoid suspension in aqueous compositions. For the purposes of this discussion, stability will be defined as the resistance to produce a deposit of the carotenoid around the perimeter of the container in the region of the surface of the beverage (ringing).

The processes to incorporate carotenoids into beverages that are in use today, utilize high shear mixing, organic solvents, high heating or oil and emulsifiers. Often times, the result of the carotenoid incorporation involves ringing of the carotenoid in the finished product. This characteristic is visually undesirable and requires considerable shaking of the beverage to redistribute the carotenoid. Many times the ring is adhered to the plastic or glass and becomes difficult, if not impossible to redistribute. The present invention utilizes sucrose fatty acid esters (SFAE) and antifoam to disperse carotenoids in beverages and other water-based systems, while maintaining their stability against ringing.

There are several factors that may affect the stability against ringing in aqueous compositions. It is possible that an optimal level of SFAE is required to keep the carotenoid in the suspension. The hydrophilic/lipophilic balance (HLB) of the SFAE may affect the interaction of the carotenoids with the aqueous composition. Additionally, the inclusion level of the SFAE/carotenoid suspension may determine the stability against ringing. The inherent compositional difference of fruit drinks and fortified water would also suggest that an examination of the stability against ringing in water, as well as in a beverage preparation, should be performed. These factors have been examined to determine whether there are optimal levels of SFAE and carotenoids that contribute to the stability against ringing. The materials used are those presented in Table 1. Stability against ringing was examined using SFAE/carotenoid liquid compositions in potable water and a model beverage system. The SFAE/carotenoid dry composition was used in a model beverage system. Liquid SFAE/carotenoid compositions were made by slowly mixing the appropriate weight percent of SFAE into the water until dissolved (Table 6). At this point the carotenoid was mixed into the SFAE/water mixture until evenly dispersed. The dry SFAE/lutein composition was prepared by removing the water from the liquid SFAE/lutein composition using a horizontal wiped film evaporator until the total moisture was less than 1%. These SFAE/carotenoids compositions were added either to potable water or to the model beverage system. Visual observations for stability against ringing were made after allowing the samples to stand for 1 week at 4° C., ambient, and 40° C.

TABLE 6

Composition of SFAE/Carotenoid Suspensions

| Sample | SFAE % | SFAE % | Carotenoid | Carotenoid |
|---|---|---|---|---|
| 1 | M-1695 | 20 | 1 | lutein |
| 2 | M-1695 | 30 | 1 | lutein |
| 3 | M-1695 | 20 | 3 | lutein |
| 4 | M-1695 | 30 | 3 | lutein |
| 5 | M-1695 | 20 | 5 | lutein |
| 6 | M-1695 | 30 | 5 | lutein |
| 7 | M-1695 | 20 | 7 | lutein |
| 8 | L-1695 | 20 | 1 | lutein |
| 9 | M-1695 | 20 | 1 | lutein |
| 10 | L-1695 | 20 | 1 | lutein |
| 11 | L-1695 | 20 | 1 | lutein |

TABLE 6-continued

Composition of SFAE/Carotenoid Suspensions

| Sample | SFAE % | SFAE % | Carotenoid | Carotenoid |
|---|---|---|---|---|
| 12 | L-1695 | 20 | 5 | lutein |
| 13 | L-1695 | 20 | 7 | lutein |
| 14 | L-1695 | 20 | 10 | lutein |
| 15 | M-1695 | 20 | 10 | lutein |
| 16 | M-1695 | 25 | 1 | lutein |
| 17 | M-1695 | 15 | 1 | lutein |
| 18 | L-1695 | 25 | 1 | lutein |
| 19 | L-1695 | 30 | 1 | lutein |
| 20 | L-1695 | 50 | 2 | lutein |
| 21 | L-1695 | 20 | 5 | zeaxanthin |
| 23 | L-1695 | 20 | 5 | β-carotene |
| 24 | L-1695 | 20 | 5 | lutein esters |
| 25 | L-1695 | 20 | 5 | lycopene |
| 26 | L-1695 | 20 | 1 | lycopene |

Table 7 shows that settling occurred after 2–3 days in all water samples. Simple shaking of the container resulted in instant redistribution of the SFAE/lutein suspension, and again, required 2–3 days before settling occurred. Ringing did not occur during the one-week period in any of the water samples. It is common for purified lutein crystals to float to the top (ring) when added to water. The opposite effect was seen in the water samples that contained the SFAE/lutein suspension. This may suggest that the sucrose fatty acid esters were causing the lutein to sink. The ration of SFAE to lutein was adjusted to 20% SFAE and 5% lutein in an attempt to reduce the settling. This ratio resulted with a minimal amount of settling in the water sample that contained 0.5 lutein/8 oz. serving.

Ringing was seen in the samples that incorporated lutein esters. This may be because of structure differences between the esterified and non-esterified carotenoids. It was also observed that, while the settled particles were very fine in nature, the floating (ringing) particles appeared as larger, irregular agglomerates. These differences may be corrected by using a different SFAE/carotenoid ratio, a different SFAE derivative, or a SFAE with a different HLB value.

TABLE 7

SFAE/Carotenoids Suspensions in Water

| | | Conc. Product Composition | | | | | |
|---|---|---|---|---|---|---|---|
| Sample | mg Carotenoid/Serving | SFAE | % SFAE | % Carotenoid | Carotenoid | Ringing | Settling |
| W1 | 0.5 | L-1695 | 15 | 1 | lutein | | X |
| W2 | 1.5 | L-1695 | 15 | 1 | lutein | | X |
| W3 | 3.0 | L-1695 | 15 | 1 | lutein | | X |
| W4 | 0.5 | M-1695 | 15 | 1 | lutein | | X |
| W5 | 1.5 | M-1695 | 15 | 1 | lutein | | X |
| W6 | 3.0 | M-1695 | 15 | 1 | lutein | | X |
| W7 | 0.5 | L-1695 | 20 | 1 | lutein | | X |
| W8 | 1.5 | L-1695 | 20 | 1 | lutein | | X |
| W9 | 3.0 | L-1695 | 20 | 1 | lutein | | X |
| W10 | 0.5 | M-1695 | 20 | 1 | lutein | | X |
| W11 | 1.5 | M-1695 | 20 | 1 | lutein | | X |
| W12 | 3.0 | M-1695 | 20 | 1 | lutein | | X |
| W13 | 0.5 | L-1695 | 25 | 1 | lutein | | X |
| W14 | 1.5 | L-1695 | 25 | 1 | lutein | | X |
| W15 | 3.0 | L-1695 | 25 | 1 | lutein | | X |
| W16 | 0.5 | M-1695 | 25 | 1 | lutein | | X |
| W17 | 1.5 | M-1695 | 25 | 1 | lutein | | X |
| W18 | 3.0 | M-1695 | 25 | 1 | lutein | | X |
| W19 | 0.5 | L-1695 | 30 | 1 | lutein | | X |
| W20 | 1.5 | L-1695 | 30 | 1 | lutein | | X |
| W21 | 3.0 | L-1695 | 30 | 1 | lutein | | X |
| W22 | 0.5 | M-1695 | 30 | 1 | lutein | | X |
| W23 | 1.5 | M-1695 | 30 | 1 | lutein | | X |
| W24 | 3.0 | M-1695 | 30 | 1 | lutein | | X |
| W25 | 0.5 | L-1695 | 20 | 5 | lutein | | minimal |
| W26 | 1.5 | L-1695 | 20 | 5 | lutein | | X |
| W27 | 3.0 | L-1695 | 20 | 5 | lutein | | X |
| W28 | 0.5 | M-1695 | 20 | 5 | lutein | | X |
| W29 | 1.5 | M-1695 | 20 | 5 | lutein | | X |
| W30 | 3.0 | M-1695 | 20 | 5 | lutein | | X |
| W31 | 0.5 | L-1695 | 20 | 10 | lutein | | X |
| W32 | 1.5 | L-1695 | 20 | 10 | lutein | | X |
| W33 | 3.0 | L-1695 | 20 | 10 | lutein | | X |
| W34 | 0.5 | M-1695 | 20 | 10 | lutein | | X |
| W35 | 1.5 | M-1695 | 20 | 10 | lutein | | X |
| W36 | 3.0 | M-1695 | 20 | 10 | lutein | | X |
| 1 | 0.5 | L-1695 | 20 | 5 | β-carotene | | X |

TABLE 7-continued

SFAE/Carotenoids Suspensions in Water

| | | | Conc. Product Composition | | | | |
|---|---|---|---|---|---|---|---|
| Sample | mg Carotenoid/Serving | SFAE | % SFAE | % Carotenoid | Carotenoid | Ringing | Settling |
| 2 | 1.5 | L-1695 | 20 | 5 | β-carotene | | X |
| 3 | 3.0 | L-1695 | 20 | 5 | β-carotene | | X |
| 4 | 0.5 | L-1695 | 20 | 5 | zeaxanthin | | X |
| 5 | 1.5 | L-1695 | 20 | 5 | zeaxanthin | | X |
| 6 | 3.0 | L-1695 | 20 | 5 | zeaxanthin | | X |
| 7 | 0.5 | L-1695 | 20 | 5 | lutein esters | XX | X |
| 8 | 1.5 | L-1695 | 20 | 5 | lutein esters | XX | X |
| 9 | 3.0 | L-1695 | 20 | 5 | lutein esters | XX | X |
| 10 | 0.5 | L-1695 | 20 | 1 | lycopene | | X |
| 11 | 1.5 | L-1695 | 20 | 1 | lycopene | | X |
| 12 | 3.0 | L-1695 | 20 | 1 | lycopene | | X |

X Small individual particles were seen at the upper perimeter of the beverage (ringing) or the bottom of the container (settling)
XX Large, individual particles were seen at the upper perimeter of the beverage The results in Table 8 show that no ringing was seen in the model beverage system when 0.5 mg was incorporated into an 8 fl. oz. serving except with the use of the liquid SFAE/lutein suspension. This suggests that the drying process may contribute to the stability against ringing. Ringing was seen in the 3 mg lutein/8 fl. oz. serving, regardless of whether the dry or liquid product was used; however, the beverage that incorporated the dry product had less ringing and retained more color throughout, whereas the beverage incorporating the liquid product is clearer in color, with a highly visible ring at the upper perimeter of the beverage. These results further indicate that the drying process may be involved in the enhancement of stability against ringing.

When payloads above 3 mg lutein/8 fl. oz. serving were used in the beverage, inconsistencies were seen in the occurrence of ringing and settling. More trials need to be conducted to determine the maximum stable lutein payload in a beverage using the current dry SFAE/lutein composition.

The beverages that incorporated 3 mg carotenoid/8 fl. oz. serving showed ringing except in the of the 20% SFAE/1% lycopene. This beverage showed a considerable amount of settling. Beverages with carotenoids at the level of 0.5 mg/serving (with the exception of lutein ester) did not show ringing or settling. Consistent with the water examples, the ringing seen in the beverage samples with lutein esters contained large agglomerates instead of fine particles.

TABLE 8

Model Beverage System Using SFAE/Lutein Compositions

| Sample | mg Carotenoid/Serving | SFAE | % SFAE | % Carotenoid | Carotenoid | Safe Product Form | Ringing | Settling |
|---|---|---|---|---|---|---|---|---|
| 1 | 0.5 | L-1695 | 84 | 16 | lutein | dry | | |
| 2 | 3 | L-1695 | 84 | 16 | lutein | dry | X | |
| 3 | 5 | L-1695 | 84 | 16 | lutein | dry | X | X |
| 4 | 7 | L-1695 | 84 | 16 | lutein | dry | | |
| 5 | 8 | L-1695 | 84 | 16 | lutein | dry | X | X |
| 6 | 10 | L-1695 | 84 | 16 | lutein | dry | | X |
| 7 | 0.5 | L-1695 | 20 | 5 | lutein | liquid | X | |
| 8 | 3 | L-1695 | 20 | 5 | lutein | liquid | X | |
| 9 | 0.5 | L-1695 | 20 | 5 | zeaxanthin | liquid | | |
| 10 | 3 | L-1695 | 20 | 5 | zeaxanthin | liquid | X | |
| 11 | 0.5 | L-1695 | 20 | 5 | lutein esters | liquid | XX | |
| 12 | 3 | L-1695 | 20 | 5 | lutein esters | liquid | XX | |
| 13 | 0.5 | L-1695 | 20 | 5 | β-carotene | liquid | | |
| 14 | 3 | L-1695 | 20 | 5 | β-carotene | liquid | X | |
| 15 | 0.5 | L-1695 | 20 | 5 | lycopene | liquid | X | X |
| 16 | 3 | L-1695 | 20 | 5 | lycopene | liquid | X | X |
| 17 | 0.5 | L-1695 | 20 | 1 | lycopene | liquid | | |
| 18 | 3 | L-1695 | 20 | 1 | lycopene | liquid | | X |

X Small individual particles were seen at the upper perimeter of the beverage or the bottom of the container
XX Large, individual particles were seen at the upper perimeter of the beverage

EXAMPLE 3

Experiments were conducted to evaluate the stability of carotenoids added to skin lotion compositions against settling and ringing and the stability of the color of the lotion compositions resulting from the addition of the carotenoids. Lotion compositions were made using the ingredient phases of Table 9.

TABLE 9

Ingredients Used in Lotion Compositions

| Phase | Materials: | % (by Weight) |
|---|---|---|
| A. | Ester (Tego Care 450, Goldschmidt) | 2.00 |
|  | Octyl stearate (Tegosoft OS, Goldschmidt) | 4.50 |
|  | Octyl palmitate (Tegosoft OP, Goldschmidt) | 3.50 |
|  | Caprylic/capric trigylceride (Tegosoft CT, Goldschmidt) | 4.00 |
|  | Polyether Modified Polysiloxane (Abil B-8863, Goldschmidt) | 0.50 |
|  | Cetyl Dimethicone (Abil Wax 9801, Goldschmidt) | 0.50 |
| B. | Glycerin | 3.00 |
|  | Water (aqua) | Variable |
| C. | Carbomer 941 | 0.20 |
| D. | Octyl Palmitate (Tegosoft OP, Goldschmidt) | 0.80 |
| E. | Sodium Lactate; Sodium PCA; Urea; Fructose; Glycine; Inositol; Sodium Benzoate; and Lactic Acid (Lactil, Goldschmidt) | 0.45 |
|  | Sodium Hydroxide, 10% sol'n | 0.40 |
| F. | Fragrance (parfum), preservatives | 0.60 |
| G. | Lutein Sucrose Ester | Variable |

Contents for all lotion formulations are consistent except for the amount and percentage of water used which is dependent on the added sucrose ester amount. This amount varied due to lutein content in various sucrose esters. The amount of sucrose ester added to the lotion formulation is then subtracted from the water amount. Below are the lotion formulations that have been made and the amounts of sucrose ester and water added to the formulation.

TABLE 10

Lotion Formula Compositions

| Lutein (Part Per Million) | Sample Description | Grams Water Added | Percent Water Added | Grams Sucrose Ester Added | Percent Sucrose Ester Added |
|---|---|---|---|---|---|
| 1) 50 ppm | Sucrose Ester L-1695 20% Lutein 7% | 198.696 | 79.479 | 0.1787 | 0.005 |
| 2) 50 ppm | Sucrose Ester L-1695 20% Lutein 15.75% Dry Product | 198.796 | 79.512 | 0.0793 | 0.005 |
| 3) 150 ppm | Sucrose Ester L-1695 20% Lutein 15.75% Dry Product | 198.637 | 79.455 | 0.238 | 0.015 |
| 4) 150 ppm | Sucrose Ester L-1695 20% Lutein 7% | 198.339 | 79.336 | 0.5357 | 0.015 |
| 5) 150 ppm | Sucrose Ester M-1695 20% Lutein 1% | 195.125 | 78.05 | 3.75 | 0.015 |

The lotion compositions of Table 10 were prepared using the following method. Phase G is dissolved into phase B. The mixture was then homogenized for 1 minute at a setting of 5 using the Polytron Homogenizer manufactured by Kinematica. Phase A and Phase B were then warmed to 80° C. in separate jars. Phase B was then added to Phase A without stirring. Phases C and D were then added to the mixer which was then homogenized for 1 minute on a setting of 5. While constantly stirring, the mixture was then cooled to a temperature between 35–40° C. at which time Phases E and F were added. This final mixture was then stirred until viscosity developed.

Colorimetry was performed on some of the lotions at different stability time points. The results of these studies are shown in Table 11. To describe the difference seen in lotions, four different values are determined:

1) $L^*$=An increase in this number means the lotion is getting darker and conversely a decrease in this number means the lotion is getting lighter.
2) $A^*$=An increase in this number means the lotion is getting more red and conversely a decrease in this number means the lotion is getting more green.
3) $B^*$=An increase in this number means the lotion is getting more yellow and conversely a decrease in this number means the lotion is getting more blue.
4) Total Value=This number is used as a total calculated value to allow comparisons between lotions.

TABLE 11

Colorimetry Data on Newly Prepared and Aged Compositions

| Day | $L^*$ | $A^*$ | $B^*$ | Total Value | Storage |
|---|---|---|---|---|---|
| Lotion - 50 ppm dry sucrose ester 15.75% Lutein | | | | | |
| 1 | 88.57 | 5.87 | 64.45 | 91.23 | Initial reading |
| Lotion = 50 ppm 20% SE-L 1695 7% Lutein | | | | | |
| 1 | 88.24 | 5.41 | 59.47 | 87.06 | Initial reading |
| 12 | 87.4 | 5.68 | 64 | 91.3 | 40 degrees |
| 13 | 88.57 | 5.3 | 59.78 | 87.06 | Room Temperature |

TABLE 11-continued

Colorimetry Data on Newly Prepared and Aged Compositions

| Day | L* | A* | B* | Total Value | Storage |
|---|---|---|---|---|---|
| Lotion - 150 ppm 20% SE-M1695 1% Lutein | | | | | |
| 1 | 84.06 | 9.02 | 56.71 | 90.32 | Initial reading |
| Lotion - 150 ppm 20% SE-L1695, 7% Lutein | | | | | |
| 1 | 86.3 | 8.94 | 48.21 | 81.07 | Initial reading |
| 19 | 85.45 | 8.35 | 62.2 | 93.3 | 40 degrees |
| 20 | 87.76 | 7.9 | 48.74 | 79.75 | Room Temperature |
| Lotion - 150 ppm dry sucrose ester 15.75% Lutein | | | | | |
| 1 | 84.29 | 12.08 | 74.89 | 106.08 | Initial reading |

The colorimetry data in Table 11 demonstrates that the sucrose ester and lutein combination kept at room temperature and those kept in accelerated conditions result in color stable formulations.

The lotion compositions were also tested for the stability of the carotenoid content over time. The stability data are shown in Table 12 for each lotion after it was produced and demonstrate that the sucrose ester and lutein combination of the present invention is stable to typical formulation conditions.

TABLE 12

Stability of Carotenoid Content Over Time

| Sample Name | Mass (g) | UV-Vis (446 nm) | % Total Carotenoid | Average % TC | HPLC Area | % Lutein | Average Percent Lutein |
|---|---|---|---|---|---|---|---|
| ABML-Dry Sucrose Ester 50 ppm 15.75% Lutein | | | | | | | |
| Sample 1 | 4.88 | 0.24754 | 0.004973 | 0.005135 | 89.9924 | 0.004475 | 0.004586 |
| Sample 2 | 4.95 | 0.26989 | 0.005345 | | 88.0693 | 0.004708 | |
| Sample 3 | 5.05 | 0.26203 | 0.005087 | | 89.9199 | 0.004574 | |
| ABML-Sucrose Esters 50 ppm- 20% L-1695 w/7% Lutein | | | | | | | |
| Sample 1 | 2.99 | 0.09234 | 0.006055 | 0.006332 | 90.5867 | 0.005485 | 0.005297 |
| Sample 2 | 3 | 0.09523 | 0.006224 | | 81.9279 | 0.005099 | |
| Sample 3 | 3.04 | 0.09435 | 0.006086 | | 83.0116 | 0.005052 | |
| Sample 4 | 3.04 | 0.10797 | 0.006964 | | 79.7213 | 0.005552 | |
| ABML-Dry Sucrose Ester 150 ppm 15.75% Lutein | | | | | | | |
| Sample 1 | 4.99 | 0.6773 | 0.013307 | 0.014069 | 86.6512 | 0.011531 | 0.012104 |
| Sample 2 | 5.03 | 0.54639 | 0.01065 | | 86.2817 | 0.009189 | |
| Sample 3 | 5.12 | 0.77463 | 0.014833 | | 83.5663 | 0.012395 | |
| Sample 4 | 4.99 | 0.89008 | 0.017488 | | 87.4938 | 0.0153 | |
| ABML-Sucrose Esters 150 ppm- 20% L-1695 7% Lutein | | | | | | | |
| Sample 1 | 3.07 | 0.1591 | 0.015242 | 0.015392 | 90.1081 | 0.013735 | 0.01384 |
| Sample 2 | 3.14 | 0.16272 | 0.015242 | | 89.6568 | 0.013665 | |
| Sample 3 | 3.1 | 0.1654 | 0.015693 | | 89.9844 | 0.014121 | |
| ABML-Sucrose Esters 150 ppm- 20% M-1695 1% Lutein | | | | | | | |
| Sample 1 | 3.21 | 0.14406 | 0.0132 | 0.013378 | 89.7516 | 0.011847 | 0.012003 |
| Sample 2 | 3.23 | 0.14709 | 0.013394 | | 89.6658 | 0.01201 | |
| Sample 3 | 3.33 | 0.1533 | 0.01354 | | 89.7505 | 0.012152 | |

The foregoing description comprise illustrative embodiments of the present inventions. The foregoing embodiments and the methods described herein may vary based on the ability, experience, and preference of those skilled in the art. Merely listing the steps of the method in a certain order does not necessarily constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A process for the preparation of a stable composition of carotenoids finely dispersed in an aqueous medium for use in animal and human foods and beverages, comprising the steps of:
   (a) adding between about 1 and 40 weight percent of an emulsifier having an HLB number of between about 12 and about 18 to an aqueous medium;
   (b) dispersing in the aqueous medium without heating a carotenoid-containing ingredient in an amount between about 0.1 and about 20 weight percent.

2. A process as defined in claim 1, wherein the emulsifier is selected from the group consisting of lecithin and lysolecithin, sucrose fatty acid esters, and poly glycol esters.

3. A process as defined in claim 1, wherein the carotenoid-containing ingredient includes a carotenoid selected from the group consisting of actinioerythrol, astaxanthin, bixin, canthaxanthin, capsanthin, capsorubin, β-8'-apo-carotenal (apo-carotenal), β-12'-apo-carotenal, α-carotene, β-carotene, a mixture of α- and β-carotenes, γ-carotene, β-cryptoxanthin, lutein, lycopene, violerythrin, zeaxanthin, and esters of hydroxyl- or carboxyl-containing members thereof.

4. A process as defined in claim 1, further comprising the step of adding between about 0.1 and 1.0 weight percent of the carotenoid.

5. A process as defined in claim 1, further comprising the step of adding an alcohol in an amount between about 0 and 4 weight percent to reduce the viscosity of the dispersion.

6. A process as defined in claim 1, further comprising the step of drying the composition to form a powder.

7. A process as defined in claim 6, wherein the step of drying is selected from the group consisting of lyophilization, spray drying, and horizontal thin-film evaporation.

8. A concentrated food, beverage, or personal care product containing a finely dispersed carotenoid made by the process of claim 1.

9. A food, beverage, or personal care product supplemented with a carotenoid product made by the process of claim 1.

10. A process as defined in claim 1, further comprising the step of adding an anti-foam agent to the dispersion, in an amount between about 0.01 and about 0.1 weight percent.

11. A process as defined in claim 10, wherein the anti-foam agent is selected from the group consisting of silicone based anti-foam agents including polydimethylsiloxane.

12. A process as defined in claim 1, further comprising the step of adding an antioxidant.

13. A process as defined in claim 12, wherein the antioxidant is selected from the group consisting of tocopherols, extracts of rosemary, ascorbyl palmitate, citric acid, ascorbic acid, BHA, and BHT.

14. A process for the preparation of a stable composition of carotenoids finely dispersed in an aqueous medium for use in animal and human foods and beverages, comprising the steps of:

(a) adding between about 1 and 40 weight percent of an emulsifier having an HLB number of between about 12 and about 18 to an aqueous medium; and (b) dispersing in the aqueous medium at a temperature less than about 80° C. a carotenoid-containing ingredient in an amount between about 0.1 and about 20 weight percent.

15. A concentrated food, beverage, or personal care product containing a finely dispersed carotenoid made by the process of claim 14.

* * * * *